(12) United States Patent
Eismark et al.

(10) Patent No.: US 8,499,735 B2
(45) Date of Patent: Aug. 6, 2013

(54) DEVICE FOR REDUCING EMISSIONS IN A VEHICLE COMBUSTION ENGINE

(75) Inventors: Jan Eismark, Göteborg (SE); Michael Balthasar, Götborg (SE)

(73) Assignee: Volvo Lastvagnar AB, Göteborg (SE)

( * ) Notice: Subject to any disclaimer, the term of this patent is extended or adjusted under 35 U.S.C. 154(b) by 768 days.

(21) Appl. No.: 12/740,704

(22) PCT Filed: Oct. 30, 2007

(86) PCT No.: PCT/SE2007/000959
§ 371 (c)(1),
(2), (4) Date: Apr. 30, 2010

(87) PCT Pub. No.: WO2009/058055
PCT Pub. Date: May 7, 2009

(65) Prior Publication Data
US 2010/0258076 A1    Oct. 14, 2010

(51) Int. Cl.
*F02F 3/00* (2006.01)
*F02B 19/00* (2006.01)

(52) U.S. Cl.
USPC .................................. 123/193.4; 123/280

(58) Field of Classification Search
USPC ............... 123/193.4, 193.6, 276, 279, 280, 123/282, 285, 298–302, 305–307
See application file for complete search history.

(56) References Cited

U.S. PATENT DOCUMENTS

| | | | | |
|---|---|---|---|---|
| 5,042,441 A | * | 8/1991 | Paul et al. | 123/276 |
| 5,215,052 A | * | 6/1993 | Augustin | 123/276 |
| 5,868,112 A | * | 2/1999 | Mahakul et al. | 123/263 |
| 7,143,738 B2 | * | 12/2006 | Ganz et al. | 123/295 |
| 7,942,126 B2 | * | 5/2011 | Zoller | 123/298 |
| 2005/0252483 A1 | * | 11/2005 | Ganz et al. | 123/299 |
| 2010/0258076 A1 | * | 10/2010 | Eismark et al. | 123/279 |
| 2011/0023819 A1 | * | 2/2011 | Ives et al. | 123/298 |
| 2011/0253094 A1 | * | 10/2011 | Rothbauer et al. | 123/276 |
| 2013/0047950 A1 | * | 2/2013 | Eismark et al. | 123/193.6 |

FOREIGN PATENT DOCUMENTS

| | | |
|---|---|---|
| EP | 0528166 A1 | 2/1993 |
| GB | 768992 A | 2/1957 |
| GB | 790996 A | 2/1958 |

OTHER PUBLICATIONS

International Search Report for corresponding International App. PCT/SE2007/000959.
International Preliminary Report on Patentability for corresponding International App. PCT/SE2007/000959.

(Continued)

*Primary Examiner* — Stephen K Cronin
*Assistant Examiner* — Sherman Manley
(74) *Attorney, Agent, or Firm* — WRB-IP LLP

(57) ABSTRACT

A combustion chamber in an engine includes a piston and an injector with plurality of orifices arranged to inject spray/flame plumes, which impinge on a piston outer bowl section during most of the injection. Between spray/flame plume impingement areas and in a plane substantially perpendicular to reciprocal piston movement are arranged a first type of protrusions protruding into the combustion chamber, having a smooth form for preserving kinetic energy in the flame and for redirecting circumferential flame progress mainly towards a center axis of the piston with minimal flame-to-flame interaction. A second type of protrusions are arranged in the impingement areas, being adapted for redirecting flame progress into a circumferential flame progress direction in a plane substantially perpendicular to the reciprocal piston movement and with minimal flame-to-piston wall interaction and minimal kinetic energy loss.

11 Claims, 7 Drawing Sheets

OTHER PUBLICATIONS

Supplementary European Search Report for corresponding European App. EP 07 83 5159.
JP 60 093115 A (Yanmar Diesel Engine Co) May 24, 1985 *abstract; figures 6-18 *.
JP 63 195315 A (Matsuoka Gijutsu Jimusho KK)Aug. 12, 1988 * abstract figures 1-4 *.
JP 59 010733 A (Isuzu Motors Ltd) Jan. 20, 1984 *abstact; figure 2 *.

* cited by examiner

DEVICE FOR REDUCING EMISSIONS IN A VEHICLE COMBUSTION ENGINE

BACKGROUND AND SUMMARY

The present invention relates to a device for controlling the combustion process in a combustion engine. The invention especially relates to such a device for reducing especially soot emissions but also carbon monoxide and hydrocarbon in combustion engines in which the fuel/cylinder gas mixture is ignited by compression heat generated in the cylinder.

Soot particles (or particulates) are a product which, during combustion, can both be formed and subsequently oxidized into carbon dioxide ($CO_2$). The quantity of soot particles measured in the exhaust gases is the net difference between formed soot and oxidized soot. The process is very complicated. Combustion with fuel-rich, fuel/air mixture with poor mixing at high temperature produces high soot formation. If the formed soot particles can be brought together with oxidizing substances such as oxygen atoms (O), oxygen molecules ($O_2$), hydroxide (OH) at sufficiently high temperature for a good oxidation rate, then a greater part of the soot particles can be oxidized. In a diesel engine, the oxidation process is considered to be in the same order of magnitude as the formation, which means that net soot production is the difference between formed quantity of soot and oxidized quantity of soot. The net emission of soot can therefore be influenced firstly by reducing the formation of soot and secondly by increasing the oxidation of soot. Carbon monoxide emissions (CO) and hydrocarbon emissions (HC) are normally very low from a diesel engine. Yet the percentages can rise if unburnt fuel ends up in relatively cool regions. Such regions are, in particular, zones with intense cooling located close to the cylinder wall. Another example is cavities between piston and cylinder lining.

Nitrogen oxides (NOx) are formed from the nitrogen content in the air in a thermal process which has a strong temperature dependency and depends on the size of the heated-up volume and the duration of the process.

A combustion process in which the fuel is injected directly into the cylinder and is ignited by increased temperature and pressure in the cylinder is generally referred to as the diesel process. When the fuel is ignited in the cylinder, combustion gases present in the cylinder undergo turbulent mixing with the burning fuel, so that a mixture-controlled diffusion flame is formed. The combustion of the fuel/gas mixture in the cylinder gives rise to heat generation, which causes the gas in the cylinder to expand and which hence causes the piston to move in the cylinder. Depending on a number of parameters, such as the injection pressure of the fuel, the quantity of exhaust gases recirculated to the cylinder, the time of injection of the fuel and the turbulence prevailing in the cylinder, different efficiency and engine emission values are obtained.

Below follows two examples of state of the art arrangements attempting to lower both soot and NOx-emissions by controlling the flame, and trying to brake the well known "trade off" between soot emissions and nitrogen oxide emissions, which is typical of the diesel engine, and which "trade-off" is difficult to influence. The majority of measures which reduce soot emissions increase the nitrogen oxide emissions.

EP1216347 shows an arrangement for controlling the combustion process in a combustion engine by controlling the combustion flame, with the purpose to decrease soot and NOx emissions. The fuel is injected into the combustion chamber with a sufficiently high kinetic energy (high injection pressure) so as to supply kinetic energy to the spray in such way that a spray-internal mixing process and a large-scale global mixing process between fuel and cylinder gas is achieved, thus keeping the soot emissions below a selected level. A proportion of recirculated exhaust gas is selected such that the nitrogen oxide emissions are kept below a selected level.

U.S. Pat. No. 6,732,703 shows an arrangement for minimizing NOx emissions and soot particulates. Here, the fuel spray hits inner bowl floor section during injection in order to cool down the combustion and thereby decreasing the creation of NOx. The fuel is injected with high pressure and the piston is shaped to maintain the momentum in the spray plume/flame and fuel/air mixture so that good mixing of available oxygen and soot occurs late in the combustion process. A lot of the momentum is lost when the spray plume hits the inner bowl floor section and when two adjacent flames hit each other during circumferential flame progress.

U.S. Pat. No. 5,215,052 discloses an arrangement for improved mixture of fuel/air and decreased flow loss of flame expansion in a circumferential direction in the combustion space.

This is done by providing a piston with a shallow piston recess, and depressions in the recess bottom so that they have a corrugated shape in relation to the circumferential direction of the piston recess, and mainly in a plane perpendicular to the reciprocal movement of the piston. Still a lot of momentum will be lost when the flame progresses in a circumferential direction that is perpendicular to the reciprocal movement of the piston. This arrangement is not adapted for enhanced late soot oxidation.

JP59010733 discloses a combustion chamber 8 with protrusions 10 at the top of and inside the piston bowl. There is one protrusion for each spray. Each fuel spray aims at its protrusion as to increase the flow speed of the spray along the circumferential wall of the piston bowl when it is dashed against the protrusion. A lot of the momentum is lost especially when adjacent flames hit each other during circumferential flame progress.

Due to coming future emission legislation for combustion engines there is a need to further lower the soot emission levels in order to meet coming demands.

It is, therefore, desirable to overcome the deficiencies of the prior art and to provide an internal combustion engine containing a combustion chamber arrangement designed to reduce undesirable soot emissions sufficiently to meet new regulated limits. Thus, it is desirable to minimize the amount of soot by promoting efficient flame recirculation and thereby "saving" mixing energy to the final oxidation of soot and remaining fuel. The soot reduction is especially important for fuels such as for example diesel. It is also desirable to contribute to the reduction of carbon monoxide (CO) emissions and hydrocarbon (HC) emissions. The reduction of CO and HC becomes especially important for fuels such as for example DME (dimethyl ether).

It is also desirable to provide an engine wherein the shape, position and dimensions of various features of the combustion chamber arrangement, cause the spray/flame to impinge upon and contact the piston bowl surface in the outer bowl section and in order to optimize preservation of kinetic energy in flame movements, mainly directed in a plane perpendicular to the reciprocal movement of the piston.

It is also desirable to provide a diesel engine capable of operate with significant soot emission improvements compared to e.g. an US02-engine, while also satisfying mechanical design constraints for a commercially acceptable engine.

It is also desirable to provide an engine including a combustion chamber arrangement having dimensions and dimensional relationships to ensure oxidation of sufficient amount of soot during combustion to minimize soot available for discharge to the exhaust system. This can be done without increasing the creation of NOx.

According to an aspect of the present invention, an engine with a combustion chamber is provided, comprising: an engine body including an engine cylinder, a cylinder head forming an inner surface of the combustion chamber and at least one intake port; a piston positioned for reciprocal movement in said engine cylinder between a bottom dead center position and a top dead center position, said piston including a piston crown comprising an upper surface facing the combustion chamber, said piston crown containing a piston bowl formed by an outwardly opening cavity, said piston bowl comprising a projecting portion having a distal end and an inner bowl floor section extending downwardly at a positive inner bowl floor angle from a plane perpendicular to an axis of reciprocation of the piston, said piston bowl further comprising an outwardly flared outer bowl section having a concave curvilinear shape in cross section; an injector mounted on the engine body adjacent said projecting portion of said piston bowl to inject fuel into the combustion chamber with high injection pressure, said injector comprising a plurality of orifices arranged to form fuel spray plumes, which during progress become ignited flames that impinge within predetermined impingement areas on said outer bowl section. The aspect of the invention is characterized in that said impingement areas are in the outer bowl section during most of the injection and in that substantially half way between said impingement areas in the outer bowl section and in a plane perpendicular to said reciprocal movement are arranged a first type of protrusions protruding into the combustion chamber and having a smooth form adapted for preserving kinetic energy in the flame and for redirecting circumferential flame progress mainly towards a center axis of the piston with minimal flame-to-flame interaction.

According to one embodiment of an aspect of the invention a second type of protrusions are arranged in said impingement area. Said second type of protrusions are adapted for redirecting flame progress directed towards the impingement area mainly into a circumferential flame progress direction in a plane substantially perpendicular to said reciprocal movement and with minimal flame-to-piston wall interaction and minimal kinetic energy loss.

In a further developed embodiment of an aspect of the invention said protrusions has a shape of a longitudinal ridge that extends only in the outer bowl area in a plane substantially parallel to said reciprocal movement of said piston. In another embodiment a cross-section, perpendicular to the extension of said ridge, of a top of said ridge is formed with a curved shape with a average radius that is at least ½₀ of a piston bowl radius of said piston. According to another embodiment said first type of protrusions are protruding more into the combustion chamber compared to said second type of protrusions.

Said internal combustion engine can have a first impingement in said impingement area when start of injection and a second impingement point in said impingement area when end of injection. Said ridge can be extended at least from a first position arranged in a first plane that is common for said first impingement point and said first position, and up to a second position arranged in a second plane that is common for said second impingement point and said second position. Said first and second planes are perpendicular to the reciprocal movement of said piston.

In one further preferred embodiment of an aspect of the invention said central axis is arranged to impinge said outer bowl section during the whole injection.

In another further preferred embodiment of an aspect of the invention said intake port is formed in the cylinder head for directing intake air into the combustion chamber with no or low swirling effect during operation. In a further preferred embodiment of the invention said swirling effect has a swirl ratio in the range of 0.0 to 0.7.

In another further preferred embodiment of an aspect of the invention a geometry of the inner bowl floor section in relation to the spray axis is arranged in such a way so that there is enough volume and distance between the inner bowl floor section and the spray axis (30) so that disturbing contact between the unignited nozzle near portion of the spray and the inner bowl section is avoided.

In another further preferred embodiment of an aspect of the invention said injected fuel, when injected, is arranged to form a mixture with said intake air in said combustion chamber, and that said mixture self ignites when compressed by said piston.

In another further preferred embodiment of an aspect of the invention said engine is arranged to add a predetermined portion of re-circulated exhaust gas to said intake air, said portion being adapted so that nitrogen oxide emissions emerging from said combustion are kept below a selected low level.

BRIEF DESCRIPTION OF THE DRAWING

The present invention will be described in greater detail below with reference to the accompanying drawings which, for the purpose of exemplification, shows further preferred embodiments of the invention and also the technical background, and in which:

FIG. 3b diagrammatically shows an alternative embodiment of the embodiment in FIG. 3a.

FIG. 4a diagrammatically shows corresponding side view of the spray/flame flows in FIG. 3a.

FIG. 6 shows a three dimensional view of the embodiment shown in FIGS. 3a and 4a.

DETAILED DESCRIPTION

Figure 1:
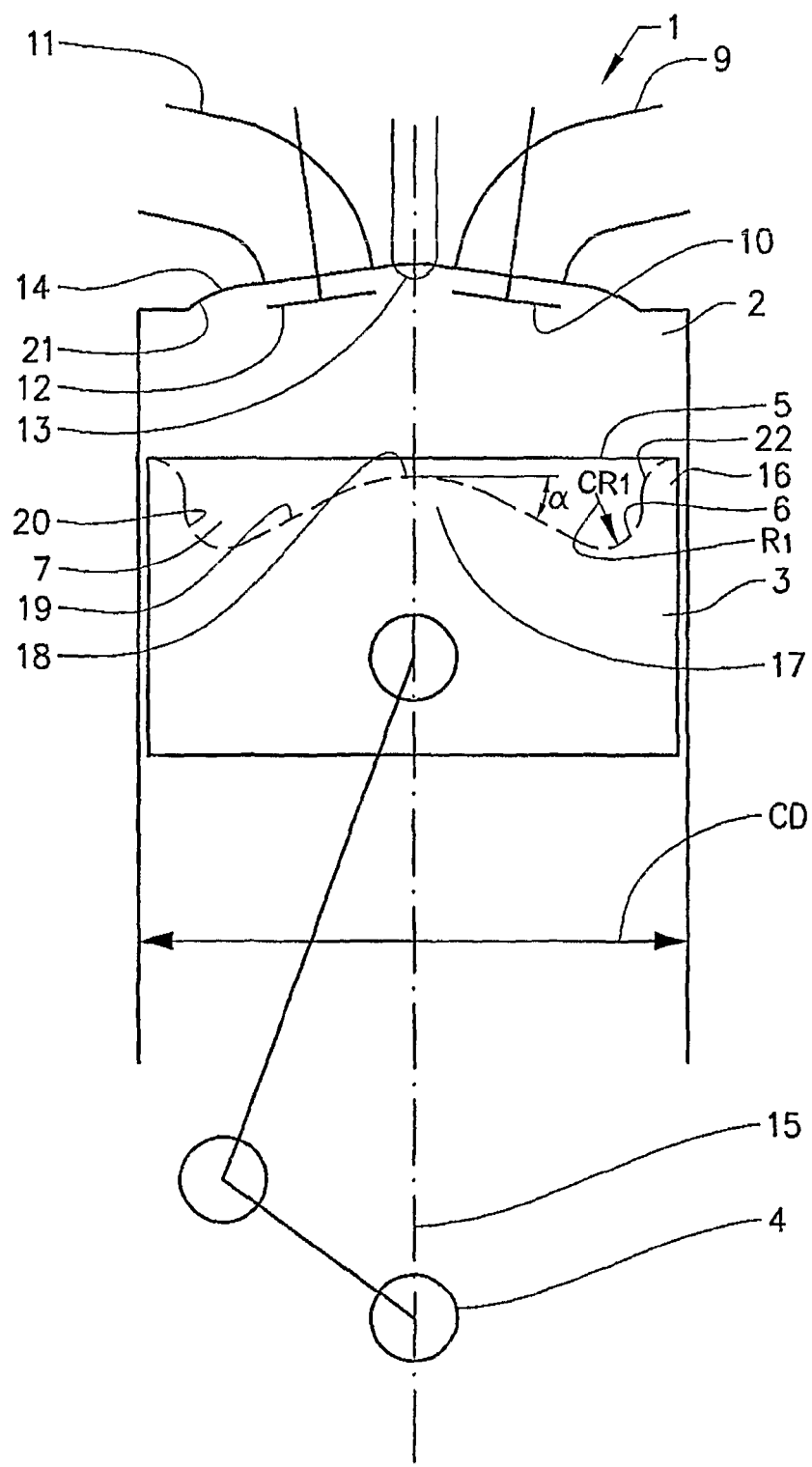
FIG. 1 diagrammatically shows a cut view of a piston and cylinder in a combustion engine of an embodiment of the invention.
Figure 2:
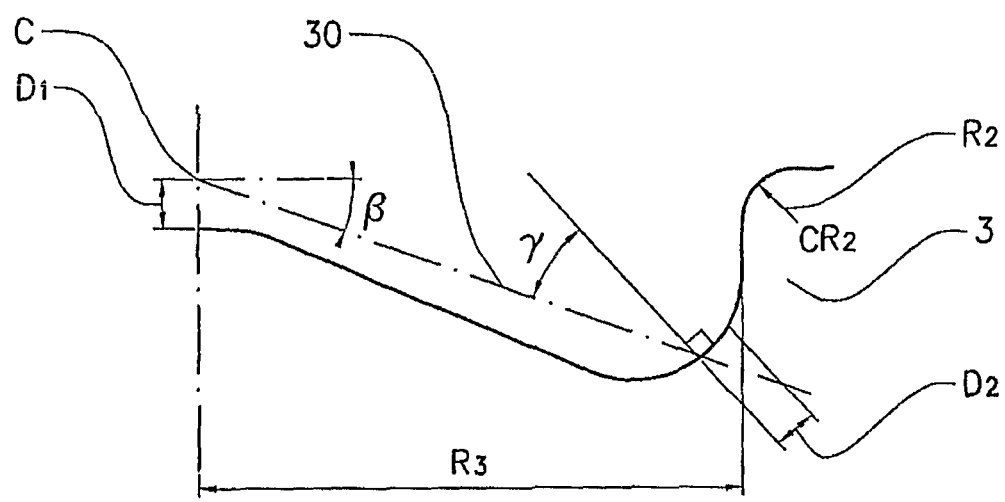
FIG. 2 diagrammatically shows the right half of the piston in FIG. 1 with reflection angle of the geometrical central axis of the spray.

To understand the unique physical characteristics of combustion chamber 7 according to the invention, attention is initially directed to FIGS. 1 and 2 illustrating the various physical characteristics or parameters which are required to achieve the unexpected emission reduction advantages of the present invention.

In FIG. 1, a diagrammatic view is shown of a combustion engine 1 which is designed to work according to the diesel process. The engine 1 comprises a cylinder 2 and a piston 3, which reciprocates in the cylinder 2 and is connected to a crankshaft 4 so that the piston 3 is set to reverse in the cylinder 2 at an upper and lower dead centre position. As is also common, one end of the cylinder cavity is closed by a engine cylinder head 14. The piston 3 is provided in its upper surface 5 with a piston bowl 6, which forms a combustion chamber 7, together with inner surface 21 of a cylinder head 14 and walls of the cylinder 2. In the cylinder head 14 one or more induction ports 9 are arranged. The connection between a respective induction port 9 and the cylinder 2 can be opened and closed with an induction valve 10 disposed in each induction port 9. Arranged in the cylinder head are also one or more exhaust ports 11. The connection between a respective exhaust port 11 and the cylinder 2 can be opened and closed with an exhaust valve 12 disposed in each exhaust port 11. The opening and closing of valves 10 and 11 may be achieved by a mechanical cam or hydraulic actuation system or other motive system in carefully controlled time sequence with the reciprocal movement of piston 3.

In the cylinder head 14 there is disposed at least one fuel injector 13, through which fuel is injected into the cylinder 2 as a fuel spray so that the fuel is mixed with gas compressed in the cylinder 2 to form a fuel/gas mixture, which is ignited by compression heat generated in the cylinder 2. The ignited part of the spray forms a flame. During injection a part of the spray closest to the injector with newly injected fuel has not yet started to burn. The fuel is preferably injected with a very high pressure. Injector 13 includes a plurality of small injection orifices (not shown), formed in the lower end of a nozzle assembly of the injector 13 for permitting the high pressure fuel to flow from a nozzle cavity of the injector 13 into the combustion chamber 7 with a very high pressure to induce thorough mixing of the fuel with the high temperature, compressed charge air within combustion chamber 7. It should be understood that injector 13 may be any type of injector capable of injecting high pressure fuel through a plurality of injector orifices into the combustion chamber 7 in the manner described hereinbelow. Moreover, injector 13 may include a mechanically actuated plunger housed within the injector body for creating the high pressure during an advancement stroke of the plunger assembly. Alternatively, the injector 13 may receive high pressure fuel from an upstream high pressure source such as in a pump-line-nozzle system including one or more high pressure pumps and/or a high pressure accumulator and/or a fuel distributor. The injector 13 may include an electronically actuated injection control valve which supplies high pressure fuel to the nozzle valve assembly to open a nozzle valve element, or controls the draining of high pressure fuel from the nozzle valve cavity to create a pressure imbalance on the nozzle valve element thereby causing the nozzle valve element to open and close to form an injection event. For example, the nozzle valve element may be a conventional spring-biased closed nozzle valve element actuated by fuel pressure. The fuel injector 13 is preferably centrally disposed in the cylinder head so a geometrical central axis of the fuel injector coincide with a geometrical central axis 15 of the cylinder, which geometrical central axis also is an axis of reciprocation of the piston 3, as shown in FIG. 1.

The combustion engine 1 shown in FIG. 1 works according to the four-stroke principle. The engine 1 preferably comprises a plurality of cylinders 2, each provided with a piston 3, where each piston 3 is connected to a common crankshaft 4 through a connecting rod and thus causing the piston to reciprocate along a rectilinear path within the cylinder 2 as the engine crankshaft 4 rotates.

FIG. 1 illustrates the position of the piston 3 circa 45 degrees before a top dead center (TDC) position. A TDC position is achieved when the crankshaft is positioned to move the piston to the furthest most position away from the rotational axis of the crankshaft. In the conventional manner, the piston moves from the top dead center position to a bottom dead center (BDC) position when advancing through intake and power strokes. For purposes of this disclosure, the words "upward" and "upwardly" correspond to the direction away from the engine crankshaft and the words "down" and "downwardly" correspond to the direction toward the crankshaft of the engine or bottom dead center position of the piston.

At an uppermost, TDC position, piston 3 has just completed its upward compression stroke during which the charge air allowed to enter the combustion chamber 7 from induction port 9 is compressed thereby raising its temperature above the ignition temperature of the engine's fuel. This position is here considered as the 360 degrees position commencing the expansion/combustion stroke of the complete 720 degrees four stroke cycle of piston 3. The amount of charge air that is caused to enter the combustion chambers may be increased by providing a pressure boost in the engine's intake manifold. This pressure boost may be provided, for example, by a turbocharger (not shown) driven by a turbine powered by the engine's exhaust, or may be driven by the engine's crankshaft.

The engine of the present invention includes combustion chamber components and features sized, shaped and/or positioned relative to one another, as described hereinbelow, to advantageously reduce particulate matter (PM) to levels at or below new regulatory standards while maintaining acceptable fuel economy. The invention is especially directed to reduce soot emissions. Soot is one fraction of PM.

Preferably the overall dimensions, shape and/or relative positioning of the combustion chamber components and features are such that the momentum of the fuel spray/burning cylinder gas flame is preserved as long as possible on its way from the injector in a slightly downward, direction following the shape of the inner floor bowl section 19 and outer bowl section 20, and further upwards until impingement with inner surface 21 of the cylinder head occurs, thus ensuring sufficient oxidation of soot later in the combustion event.

Further, the dimensions, shape and/or relative positioning of the combustion chamber components and features are such that a predetermined level of balance between vertical (mainly upward) and tangential momentum (directed in a plane perpendicular to the axis 15) of the fuel spray/flame is achieved. This balance is important to reach in order to be able to achieve very low soot emission levels. Parameters controlling the balance are selected such that the spray/flame after it has impinged the outer bowl section 20 mainly directed in an upward direction towards the inner surface 21 of the cylinder head, in order to minimize loss of momentum.

Figure 3A:
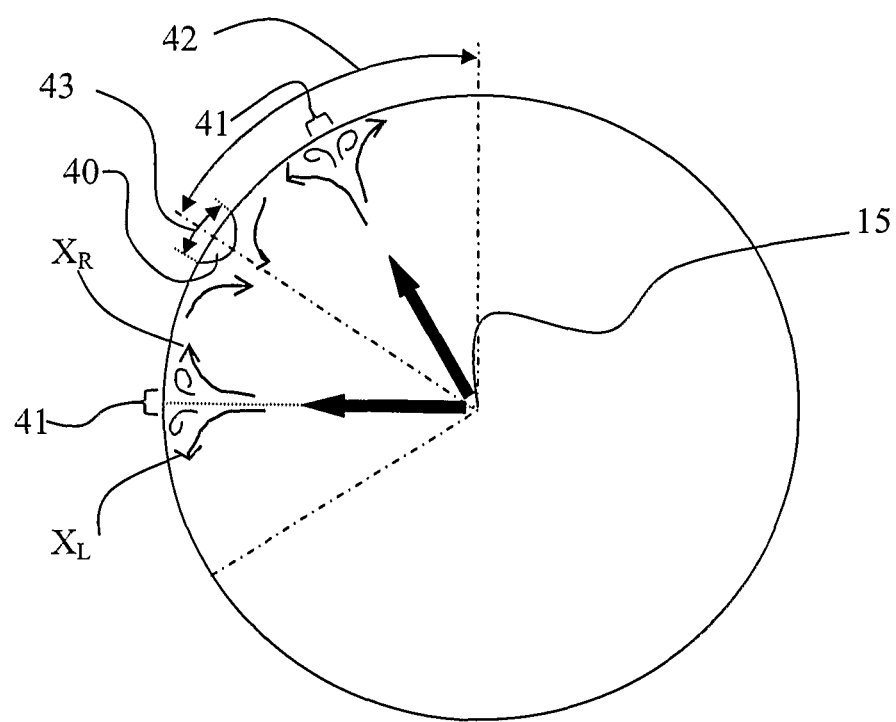
FIG. 3a diagrammatically shows a top view of the piston in FIG. 1 with spray/flame flows according to an embodiment of the invention.
Figure 3B:
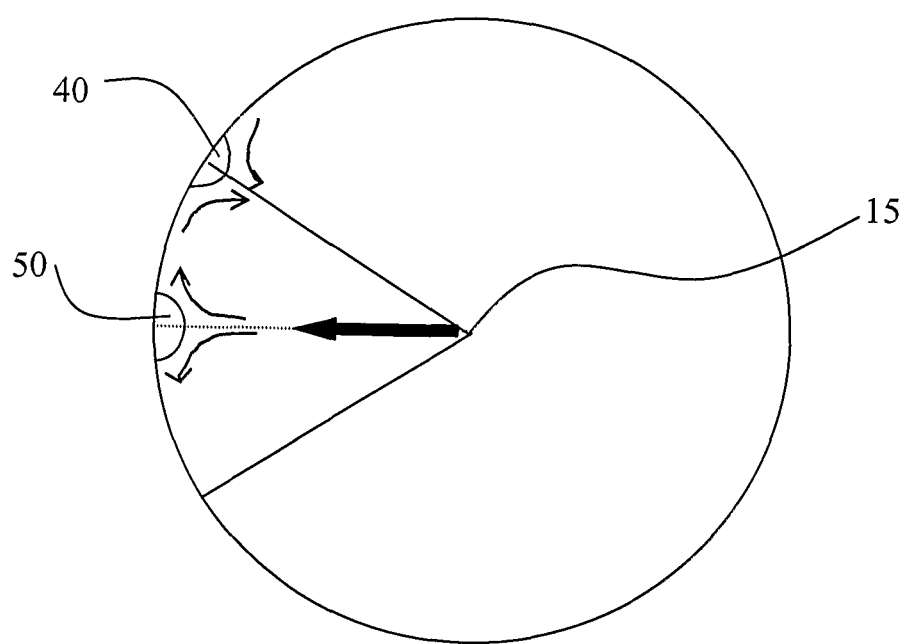
Figure 4B:
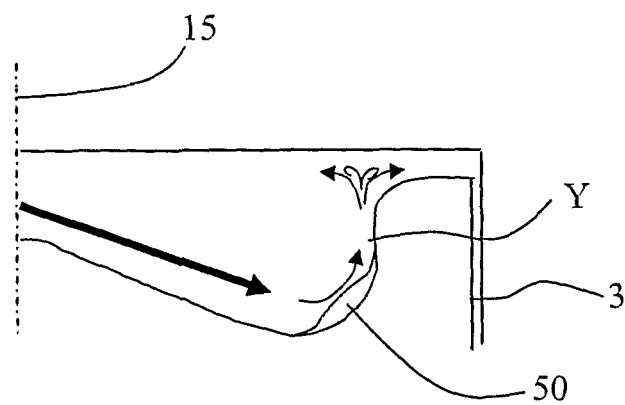
FIG. 4b diagrammatically shows corresponding side view of the spray/flame flows in FIG. 3b.
Figure 4A:
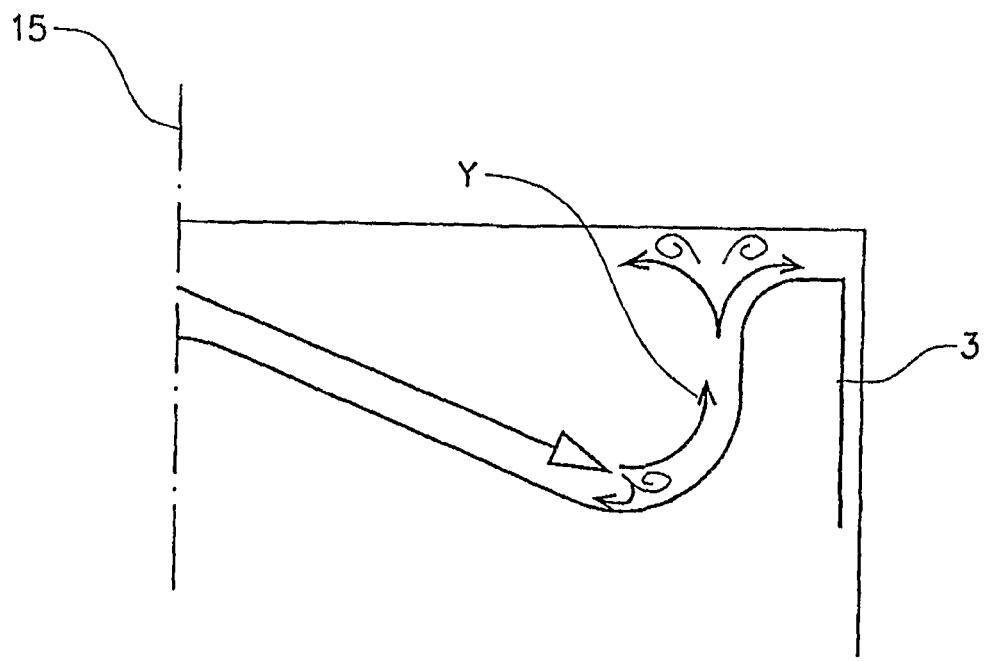

Preferably, the vertical and tangential movements of the flame form a fan-shaped pattern (see also FIG. 5d, explained below) just after impingement with outer bowl section 20, where approximately ⅓ of the flame movements are directed upwardly, as indicated with Y in FIG. 4, and the rest are directed in a tangential (horizontal) direction, as indicated with $X_R$ for the parts of the flame turning right and with $X_L$ for the parts of the flame turning left as shown in FIGS. 3a and 3b. This invention is particularly directed towards the enhancement of the redirection of the horizontal movements of the flame, i.e. when the flame changes direction from being directed towards the outer bowl to being directed in said tangential direction, and further the redirection of the tangential movement to a movement directed toward the axis 15, which is seen from above in FIGS. 3a and 3b.

The dimensions, shape and/or relative positioning of the combustion chamber components and features as described hereinbelow results in a combustion chamber capable of forming, directing, controlling and creating a pattern of injected fuel and most of all burning fuel/cylinder gas mix (flame) within the combustion chamber 7 during both the initial stages of fuel injection and during the initiation of combustion and expansion of the resulting gases during the power stroke of the piston 3 and after end of injection so as to achieve very high reduction of especially soot emissions, but also carbon monoxide and hydrocarbon.

More particularly, the upper portion of piston 3 may be referred to as the piston crown 16. Piston crown 16 includes the upper surface 5 partially forming combustion chamber 7 and a piston bowl 6 formed by an upwardly opening cavity. Piston bowl 6 includes a projecting portion 17 preferably positioned at or near the center of bowl 6. Projecting portion 17 includes a distal end 18 positioned, in the preferred embodiment shown in FIG. 1, at the center of piston bowl 3 and thus positioned along the axis of reciprocation 15 of piston 3. Projecting portion 17 also includes an inner bowl floor section 19 extending from projecting portion 17 downwardly at an inner bowl floor angle α from a plane perpendicular to the axis of reciprocation of piston 3 as shown in FIG. 1.

Piston bowl 6 also includes an upwardly flared outer bowl section 20 having a generally concave curvilinear shape in diametric cross section. Outer bowl section 20 effectively shapes and directs the flow of the fuel/air mixture or flame within the combustion chamber, especially in the upward direction (as shown best in FIG. 4).

FIG. 2 diagrammatically shows the right half of the bowl shape of the piston in FIG. 1 with reflection angle γ of the geometrical central axis 30 of the spray (below designated spray axis) and spray axis angle β (below designated spray angle). Outer bowl section 20 is designed with a particular radius Ri and a particular location for a center of radius CRi. Di further indicates the distance between the distal end 18 and the crossing point C of the several spray axis in the injector 13. Distance D2 indicates the duration of the injection and change/movement of spray axis impingement point during the downward movement of the piston 3. The position of start and end of $D_2$ is dependent on time duration (amount of fuel to be injected) and timing of the injection. Start of injection is in the lower end of the distance $D_2$ and end of injection is in the upper end of the distance $D_2$. $R_2$ indicates a radius at the lip or edge connecting outer bowl 20 with the upper surface 5 of the piston 3. Center of radius $R_2$ is indicated $CR_2$. $R_3$ indicates piston bowl radius. While the general shape of the combustion chamber has antecedence in the prior art, it is the specific configuration, and more importantly, the critical dimensions and dimensional relationships described hereinbelow which result in the improved functional performance of the present invention.

The value of the reflection angle during an injection is strongly dependent of the selection of several geometrical parameters, such as Di, Ri, β and piston bowl radius $R_3$, besides the injection timing and injection duration.

According to the invention of the present application and as already introduced above FIGS. 3a and 3b disclose two preferred embodiments of the invention and where FIG. 3a shows an embodiment with only a first type of protrusion 40 evenly distributed around the circumference of the outer bowl 6. Said first type of protrusions are arranged approximately halfway between the impingement areas 41 of two adjacent flames (in FIGS. 3a and 3b indicated by the two biggest arrows).

In a preferred embodiment of the invention said first type of protrusions has a form of a ridge that extends in the vertical direction, thus in FIGS. 3a and 3b the protrusions are seen in a cross-section from above. Said cross-section could form a horizontal line (not shown) in FIG. 2, where said horizontal line crosses through impingement area indicated by $D_2$ in FIG. 2. Thus, said first type of protrusions are arranged in the same horizontal plane as the impingement areas of the different flames. Preferably a ridge of the first type of protrusion extends in length corresponding to the length of an impingement area. Thus, said ridge of said first type of protrusion extends at least from a first position arranged in a first horizontal plane that is common for said first impingement point (lower end point of distance $D_2$) and said first position, and up to a second position arranged in a second horizontal plane that is common for said second impingement point (upper end point of distance $D_2$) and said second position. All mentioned planes are perpendicular to the reciprocal movement of said piston 3 or geometrical central axis 15 of the cylinder.

Said protrusions, when seen in a cross-section as in FIG. 3a or 3b, could have different forms. In one embodiment the top of the ridge can be more sharp (not shown). In another embodiment the end of the base of the ridge can be less sharp with a smoother transition between the ridge part and the circular shape of the outer bowl section (not shown). A combination of a sharper top of the ridge and smoother transition from ridge to circular shape of the outer bowl section is also possible (not shown). Each half of a width 43 of the base of a ridge can be extended up to, for example, approximately ⅓ of a total spray sector distance 42 along the circular shape of an outer bowl section.

FIG. 3b shows an embodiment of the invention with said first type of protrusion and a second type of protrusion 50. Said second type of protrusion redirects the horizontal movement of the flame from a direction towards the outer bowl area (impingement area) to the tangential directions $X_R$ and $X_L$.

In one embodiment of the invention a cross-section perpendicular to the extension of said ridges of said first or second type of protrusion disclose a top of said ridge that is formed with a curved shape with an average radius that is at least 1/20 of the piston bowl radius $R_3$. The shape of one such cross section can be the result of several mathematically defined curves.

In another embodiment of the invention said first type of protrusions are protruding more into the combustion chamber 7 compared to said second type of protrusions. The opposite is also possible, or that said first and second type of protrusions are identical in size.

A top of a protrusion of said first or second type is the part that protrudes furthest into the combustion chamber 7. In one embodiment of the invention a top of said first type of protrusion is positioned half way between said impingement area and along said distance $D_2$ when seen in a vertical direction. In another embodiment of the invention a top of the second type of protrusion is positioned in middle of an impingement and along said distance $D_2$.

An embodiment where only the second type of protrusions are present is also possible.

As indicated before the fuel should be injected with a high injection pressure. An example of average injection pressure interval is 300 to 4000 bar, and in a further example embodiment the range may be 1500 to 2500 bar. The injection pressure is an important parameter to ensure high momentum in the spray/flame flow throughout the movement along the inner bowl floor section, outer bowl flow section, impingement with the inner surface of the cylinder head and in particular the movements of the cylinder gas following the EOI.

Another combustion chamber parameter for controlling emissions is the swirl ratio of the air flow that is generated by the induction ports 9. The swirl ratio SR is a ratio of the tangential velocity of the air spinning around combustion chamber 7 divided by the engine speed. That is, the swirl ratio is a measure of the tangential motion of the air as it enters the engine cylinder from the induction ports 9 of the cylinder head 14. Precisely, the term swirl ratio refers to the average in-cylinder angular velocity of the air at intake valve closing divided by the cylinder piston angular velocity. For example, an engine running at 1800 rpm with a cylinder head generating an air motion with a swirl ratio of 2 implies that the air in the cylinder at intake valve closing is rotating with an average angular velocity of 3600 rpm. The higher the swirl ratio, the greater the swirling effect of the air or air fuel mixture, while the lower the swirl ratio, the lower the swirling effect. The swirling effect is a generally tangential motion that upon compression by piston 3 creates turbulence and assists in the combustion process.

According to an embodiment of the invention, to be able to ensure control of the spray/flame movement during the whole combustion, the momentum created by the injection pressure should be disturbed as little as possible. Thus, according to the invention low swirl is preferable to be able to achieve maximum advantage of the present invention when the protrusions of said first and second type are symmetrical as indicated above and in the figures. In this description a swirl below 1.0 is considered to be low swirl. The applicant has found that a swirl ratio below 0.7 is preferable, and even more preferable is a swirl ratio below 0.5 and down to zero for the above described embodiments.

In further embodiment of the invention more swirl can be allowed. In such an embodiment the protrusions of first and second type are adapted to a particular swirl range. The adaptation can be done by having a form of the protrusions (especially the top) that is swept to a certain degree in the flowing direction of the swirl. Thus, such protrusions are asymmetrical.

Ri should be sufficiently large in order to create a curvature in outer bowl section 20 that strongly maintains the momentum in the spray/flame. Outer bowl section 20 is also designed to prevent excessive momentum in the spray/flame in one or several directions which would cause the spray/flame to progress too much in a certain direction, compared to others directions, causing undesirable stagnation of the spray/flame and thus leaving behind increased soot emissions. When dimensioning said first and/or second type of protrusions prevention of excessive momentum in the spray/flame should also be considered.

As already indirectly mentioned above an important aspect involves orienting the central axis of each orifice in a spray angle β measured between a plane perpendicular to the axis of reciprocation of the piston and a central axis 30 of each spray (FIG. 2) so that the spray axis 30 impinges the outer bowl section 20 during at least a part of the injection duration. The geometry of the inner bowl floor section 19 in relation to the spray axis 30 is such that there is enough volume and distance between the inner bowl floor section and the spray axis 30 so that disturbing contact between the not ignited nozzle near portion of the spray and the inner bowl section is avoided. This action causes spray axis 30 to be directed toward outer bowl section 20 with minimal contact with the inner bowl floor section, thus avoiding disturbing the ignition of the spray. In this way contribution is made to maximize the preserving of spray/flame momentum up to the spray/flame impinges the outer bowl section.

Another important combustion chamber parameter significantly affecting soot emissions is the number of injection or spray orifices in the injector 13. In accordance with an embodiment of the present invention, at least four injection orifices are used to deliver fuel to combustion chamber 7. For a truck size combustion engine preferably, five to seven injection orifices can be used. Engines with bigger piston diameter have room for more orifices. The number of orifices is dependent of how close the impingements points of two adjacent sprays comes to each other. The number of injection orifices N is critical for creating the proper balance, mentioned above, between the vertical and tangential movements of the spray/flame. If there are too many injection orifices the distance between the different points of spray axis impingements (with the outer bowl section) would become to close to each other so that a smooth turn around movement (recirculation) of the spray in a horizontal plane would be restraint, and the upward vertical movement could become too strong, which could result in spray/flame regions where substantially all momentum is lost, thus the after oxidation of soot would decrease. Another important parameter that effects the recirculation is fuelling rate.

In order to increase the understanding of the inventive spray/flame control in horizontal plane FIGS. 5a to 5i shows three-dimensionally and diagrammatically a piston 3 with cylinder 2 in nine different on-the-spot accounts during a fuel injection and combustion sequence, i.e. from approximately 5 degrees before TDC to a time spot late in the combustion sequence, i.e. long after TDC. Note that the protrusions according to the invention are not included in FIGS. 5a to 5i. The purpose of these figures is to try to visualize the progress of two adjacent flames. The beginning of a spray axis 30 of two adjacent positioned sprays is indicated with a dotted line in FIGS. 5a to 5i. In order to increase the clarity of the FIGS. 5a to 5i only two of several sprays are shown.

Figure 5A:
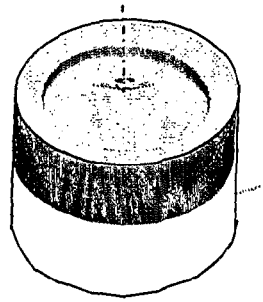
FIGS. 5a to 5i shows three-dimensionally and diagrammatically a piston according to the invention with cylinder in nine different on-the-spot accounts during a fuel injection and combustion sequence.
Figure 5B:
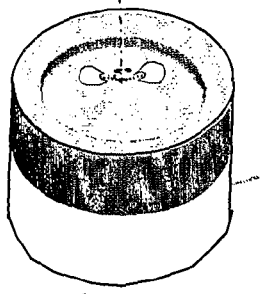
Figure 5C:
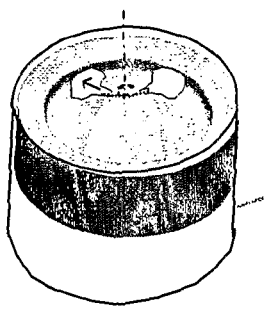
Figure 5D:
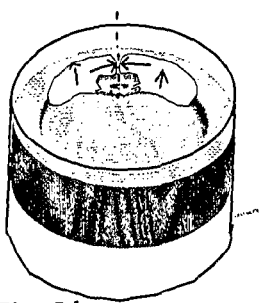

FIG. 5a shows start of injection (SOD). There is a ignition delay, which occurs between SOI and ignition of the fuel. FIG. 5b shows start of combustion (SOC). The white areas indicate burning cylinder gas flames. FIG. 5c shows when the flames impinges the outer bowl section 20 (FlameToWall). The direction of movement of the left flame (corresponding counts for the right flame) is indicated with an arrow. Thus, the flames move from injector 13 towards outer bowl section 20. FIG. 5d shows when the flames meet one another (FlameToFlame). The collision is indicated by that two of the four arrows are pointing at each other. An important balance between vertical and tangential movements can be achieved when the flames after first impingement with outer bowl section (FIG. 5c) are spread in a sun fan-shaped pattern as indicated in FIG. 5d. This is achieved by selecting combustion chamber parameters within predefined ranges. The vertical arrows in FIG. 5d correspond to Y in FIGS. 4a and 4b, and the arrow pointing to the right in FIG. 5d corresponds to $X_R$ in FIG. 3a or 3b and finally the arrow pointing to the left in FIG. 5d corresponds to $X_L$ in FIGS. 3a and 3b.

Figure 5E:
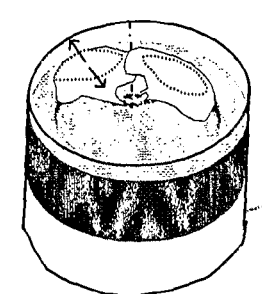
Figure 5F:
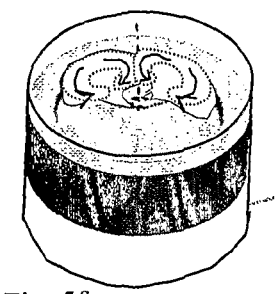
Figure 5G:
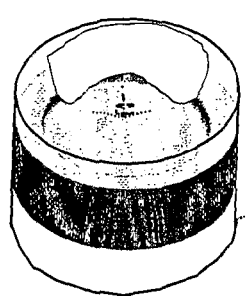
Figure 5H:
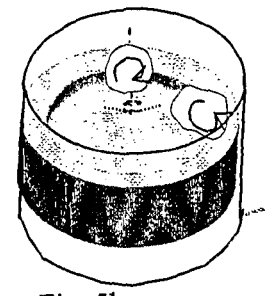

FIG. 5e shows when the flames impinge the inner surface of the cylinder head 21 (FlameToHead). This is indicated by a dotted area in the flames. Within said dotted area the flames are in contact with the inner surface 21 of the cylinder head 14. The two arrows in the left flame indicate the main movements of the flames along said inner surface 21. FIG. 5f shows the important flame re-circulation, which is forced by the FlameToHead and FlameToFlame interaction and which is a result of mainly selecting combustion chamber parameters within predefined ranges so that said balance between vertical and tangential flame movements is achieved. The parameters deciding the dimensions of said protrusions according to the invention are one of several parameters which can be used for flame control. A certain choice of said parameters controls timing and position of said flame recirculation, shown especially in FIG. 5f, but also in FIGS. 5g to 5i. The protrusions according to the invention further enhance the positive effects of said flame re-circulation. Especially a symmetric FlametoFlame interaction creates useful flame recirculation vortexes. The arrows indicate the direction of movement of the flame re-circulation, which are directed back into the combustion chamber 7. The low swirl is here indirectly a reason for more intensive mixing thanks to symmetry-driven creation of FlameToFlame-induced vortexes. With enough mixing energy (momentum) left, this flame recirculation contributes to mix and burn the last injected (and soot producing) fuel and thus also to oxidize soot late in the combustion sequence. FIG. 5g shows end of injection (EOI), thus momentum from the injection pressure has ended and further movements of the cylinder gas depends mainly on earlier provided momentum from the injection pressure. FIG. 5h shows soot oxidation and spray dilution after EOI, due to powerful mix of the cylinder gases/flame.

Figure 5I:
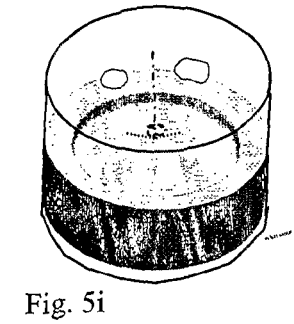
Figure 6:
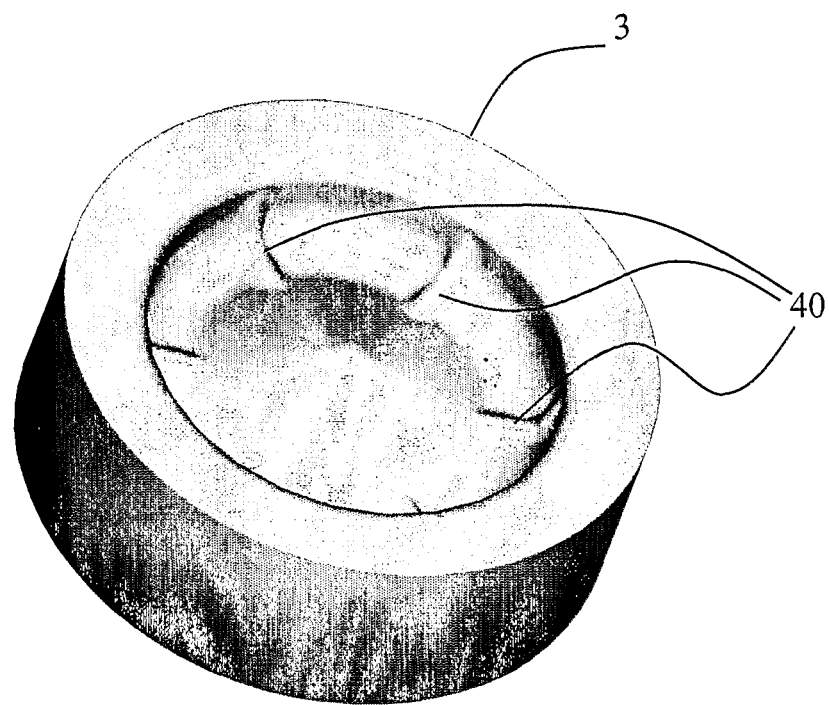

FIG. 5i shows late after burn rich pocket soot oxidation, which the current invention is aiming at to increase with better control of the horizontal spray/flame movements with the purpose to preserve momentum in the cylinder gases further, and thus as long as possible after EOI.

One important advantage of the invention is that enhanced low temperature soot after-oxidation can exist without significant nitrogenoxide (NOx) formation. The different embodiments of the invention for reducing particulates/soot emissions can advantageously be combined with different known exhaust aftertreatment arrangements for reducing NOx, (and also soot traps) to lower the NOx-emissions even further. The invention can advantageously also be combined with an exhaust gas recirculation (EGR) device, by which the level of NOx-emissions can be controlled almost independently of the particulates/soot emissions (see e.g. EP1216347).

Combinations of the above described combustion chamber parameters selected within specified ranges provide advantages in reducing soot/particulates emissions in comparison to conventional engine designs, including specifically meeting new emissions standards relative to especially soot. The inventive combustion chamber 7, besides the mentioned inventive protrusions, specifically includes a positive reflection angle γ, low swirl and high injection pressure and the positive effects of the invention can further be increased in combination with right selection of one or several of the other above mentioned parameters.

The present invention can be used in engines driven by fuels, such as for example diesel, DME (dimethyl ether) or the like.

The invention presented can be applied on engines of passenger car size and up to an engine size of a big ship.

The invention should not be deemed to be limited to the embodiments described above, but rather a number of further variants and modifications are conceivable within the scope of the following patent claims.

The invention claimed is:

1. An internal combustion engine with a combustion chamber, comprising:
   an engine body including an engine cylinder, a cylinder head forming an inner surface of the combustion chamber and at least one intake port;
   a piston positioned for reciprocal movement in the engine cylinder between a bottom dead center position and a top dead center position, the piston including a piston crown comprising an upper surface facing the combustion chamber, the piston crown containing a piston bowl (6) formed by an outwardly opening cavity, the piston bowl comprising a projecting portion having a distal end and an inner bowl floor section extending downwardly at a positive inner bowl floor angle (α) from a plane perpendicular to an axis of reciprocation of the piston, the piston bowl further comprising an outwardly flared outer bowl section having a concave curvilinear shape in cross section;
   an injector mounted on the engine body adjacent the projecting portion of the piston bowl to inject fuel into the combustion chamber with high injection pressure, the injector comprising a plurality of orifices arranged to form fuel spray plumes, which during progress become ignited flames that impinge within predetermined impingement areas on the outer bowl section, wherein the impingement areas are in the outer bowl section during most of the injection and in that substantially half way between the impingement areas in the outer bowl section and in a plane substantially perpendicular to the reciprocal movement are arranged a first type of protrusions protruding into the combustion chamber and having a smooth form adapted for preserving kinetic energy in the flame and for redirecting circumferential flame progress mainly towards a center axis of the piston with minimal flame-to-flame interaction, and where each of the protrusions has a shape of a longitudinal ridge that extends only in the outer bowl area in a plane substantially parallel to the reciprocal movement.

2. An internal combustion engine as in claim 1, wherein a second type of protrusions are arranged in the impingement area, the second type of protrusions being adapted for redirecting flame progress directed towards the impingement area mainly into a circumferential, flame progress direction in a plane substantially perpendicular to the reciprocal movement and with minimal flame-to-piston wall interaction and minimal kinetic energy loss.

3. An internal combustion engine as in claim 1, wherein a cross-section, perpendicular to the extension of the ridge, of a top of the ridge is formed with a curved shape with an average radius that is at least 1/20 of a piston bowl radius (R3) of the piston.

4. An internal combustion engine as in claim 2, wherein the first type of protrusions are protruding more into the combustion chamber compared to the second type of protrusions.

5. An internal combustion engine as in claim 1 with a first impingement in the impingement area when start of injection and a second impingement point in the impingement area when end of injection, wherein the ridge is extended at least from a first position arranged in a first plane that is common for the first impingement point and the first position, and up to a second position arranged in a second plane that is common for the second impingement paint and the second position, and where the first and second planes are perpendicular to the reciprocal movement of the piston.

6. An internal combustion engine as in claim 1, wherein a central axis (30) of the orifices is arranged to impinge the outer bowl section during the whole injection.

7. An internal combustion engine as in claim 1, wherein the intake port is formed in the cylinder head for directing intake air into the combustion chamber with no or low swirling effect during operation.

8. An internal combustion engine as in claim 7, wherein the swirling effect resulting in a swirl ratio in the range of 0.0 to 0.7.

9. An internal combustion engine as in claim 1, wherein a geometry of the inner bowl floor section in relation to the spray axis (30) is arranged in such a way so that there is enough volume and distance between the inner bowl floor section and the spray axis (30) so that disturbing contact between the unignited nozzle near portion of the spray and the inner bowl section is avoided.

10. An internal combustion engine as in claim 1, wherein the injected fuel, when injected, is arranged to form a mixture with the intake air in the combustion chamber, and that the mixture self ignites when compressed by the piston.

11. An internal combustion engine as in claim 1, wherein the engine is arranged to add a predetermined portion of recirculated exhaust gas to the intake air, the portion being adapted so that nitrogen oxide emissions emerging from the combustion are kept below a selected low level.

* * * * *